(12) United States Patent
Strezov et al.

(10) Patent No.: US 8,888,962 B2
(45) Date of Patent: Nov. 18, 2014

(54) PROCESSING ORGANIC MATERIALS

(75) Inventors: Lazar Strezov, Adamstown Heights (AU); Steven Robert Osborn, Valentine (AU); Joseph George Herbertson, Coal Point (AU); Gary Kenneth Ellem, Newcastle (AU)

(73) Assignee: The Crucible Group Pty Ltd, Toronto (AU)

( * ) Notice: Subject to any disclaimer, the term of this patent is extended or adjusted under 35 U.S.C. 154(b) by 955 days.

(21) Appl. No.: 12/937,236

(22) PCT Filed: Apr. 14, 2009

(86) PCT No.: PCT/AU2009/000455
§ 371 (c)(1),
(2), (4) Date: Oct. 8, 2010

(87) PCT Pub. No.: WO2009/124359
PCT Pub. Date: Oct. 15, 2009

(65) Prior Publication Data
US 2011/0048918 A1 Mar. 3, 2011

(30) Foreign Application Priority Data

Apr. 10, 2008 (AU) ................................. 2008901748

(51) Int. Cl.
| | | |
|---|---|---|
| C10B 49/04 | (2006.01) | |
| C10B 53/02 | (2006.01) | |
| C10B 47/44 | (2006.01) | |
| C10G 1/02 | (2006.01) | |
| C10B 53/04 | (2006.01) | |

(52) U.S. Cl.
CPC . *C10G 1/02* (2013.01); *C10B 53/02* (2013.01); *C10B 47/44* (2013.01); *C10B 53/04* (2013.01); *Y02E 50/14* (2013.01); *Y10S 201/44* (2013.01)
USPC ................... 202/85; 201/36; 201/41; 201/44; 202/91; 202/96; 202/215

(58) Field of Classification Search
USPC ........ 201/32, 36, 41, 44; 202/85, 91, 96, 108, 202/117, 118, 215
See application file for complete search history.

(56) References Cited

U.S. PATENT DOCUMENTS

| 815,453 | A | * | 3/1906 | Merrill | ............................. 201/32 |
| 1,639,417 | A | * | 8/1927 | Wallace | .......................... 201/32 |

(Continued)

FOREIGN PATENT DOCUMENTS

| CA | 2303795 A1 | 9/2001 |
| EP | 0277862 A1 | 8/1988 |
| JP | 2003286021 | 10/2003 |
| WO | 95/24600 A1 | 9/1995 |
| WO | 99/10449 | 3/1999 |
| WO | 2008/115853 A1 | 9/2008 |

OTHER PUBLICATIONS

Machine translation JP 2003-286021 (Oct. 2003) 5 pages.*

(Continued)

*Primary Examiner* — Jill Warden
*Assistant Examiner* — Joye L Woodard
(74) *Attorney, Agent, or Firm* — Fitch, Even, Tabin & Flannery LLP

(57) ABSTRACT

A method and an apparatus for pyrolysing a solid organic feed material are disclosed. Solid organic material is moved through a reaction chamber and exposed to a temperature profile within the chamber that dries and pyrolyses the organic material and releases water vapour and a volatile products gas phase. The water vapour phase and the volatile products gas phase are moved counter-current to the solid organic material so that the water vapour phase and condensable components of the volatile products gas phase condense in cooler upstream sections of the chamber and form a liquid water product and a separate liquid oil product. The liquid water product is discharged via an outlet along the length of the chamber and a dried and pyrolysed solid product is discharged from a downstream outlet in the chamber. The chamber includes a plurality of heat transfer members extending within the chamber and a supply of oxygen-containing gas for establishing and maintaining the temperature profile within the chamber.

6 Claims, 6 Drawing Sheets

(56) References Cited

U.S. PATENT DOCUMENTS

| | | | |
|---|---|---|---|
| 4,145,274 | A | 3/1979 | Green |
| 4,156,394 | A | 5/1979 | Mallek et al. |
| 4,831,944 | A | 5/1989 | Durand et al. |
| 6,244,198 | B1 | 6/2001 | Suominen |
| 7,028,414 | B2 | 4/2006 | Vonplon |
| 2008/0223268 | A1 | 9/2008 | Gehring et al. |

OTHER PUBLICATIONS

International Search Report for PCT/AU2009/000455, mailed May 25, 2009.

Rensfelt, Erik and Ostman, Anders "IEA Biomass Agreement" Task X. Biomass Utilization Biomass Therman Gasification and Gas Turbine Activity, Sub-task 6 Gasification of Waste, Summary and Conclusions of Twenty-five Years of Development; 19 pages, (May 1996).

Denys, M.B. et al., "New Advanced Carbon-Based Steel Production. Proposal SP11" 6 pages, (Oct. 2006).

Y. Ohmukai et al, "Pyrolysis of the Mixture of Biomass and Plastics in Countercurrent Flow Reactor Part I: Experimental Analysis and Modeling of Kinetics" www.fuelfirst.com; 2008; pp. 3105-3111; 7 pages.

Supplementary European Search Report date of completion Aug. 30, 2011 for EP09730742; 6 pages.

* cited by examiner

PROCESSING ORGANIC MATERIALS

CROSS REFERENCE TO RELATED APPLICATIONS

This application is a U.S. national phase application of International Application No. PCT/AU2009/000455, filed Apr. 14, 2009, which claims benefit from Australian Application No. 2008901748, filed Apr. 10, 2008, both of which are hereby incorporated herein by reference in their entirety.

FIELD

The present invention relates to a method and an apparatus for drying and pyrolysing solid organic feed materials to produce valuable products such as oil and char.

The present invention also relates to a method and an apparatus for drying solid organic feed materials to produce valuable products such as dewatered coal.

BACKGROUND

The term "organic feed materials" includes biomass, peat, coal and oil shales/sands, plastic waste materials, and also includes blends of these feed materials.

The present invention relates particularly, although by no means exclusively, to a method and an apparatus for drying and pyrolysing organic feed materials in the form of biomass and coal to produce valuable products such as oil, gas and char.

The term "biomass" is understood herein to mean living or recently living organic matter. Specific biomass products include, by way of example, forestry products (including mill residues), agricultural products, biomass produced in aquatic environments such as algae, agricultural residues such as straw, olive pits and nut shells, animal wastes, municipal and industrial residues.

The term "coal" is understood herein to include, by way of example, peat, brown coal, black coal, and a range of products referred to as "coal wastes".

The term "oil shales" is understood herein to include by way of example any geological sedimentary material containing a usable proportion of organic molecules.

The following description focuses on pyrolysis of organic feed materials in the form of biomass and coal. However, it is understood that the present invention is equally applicable to drying solid organic feed materials and has important applications in drying materials such as brown coal, with minimal if any pyrolysis, that have significant amounts of retained or bound water.

Pyrolysis of biomass and coal has been proposed as an option for producing valuable products such as oil, gas and char.

The term "pyrolysis" is understood herein to mean thermal decomposition of organic material in the absence of or with limited supply of an oxidising agent such that only partial gasification is possible. This could range from "mild pyrolysis" leading to drying and partial thermal decomposition, to "full pyrolysis" resulting in oil, gas and char products. The main products of pyrolysis are gases, liquids, and char. Typically, the gases include carbon monoxide, carbon dioxide, hydrogen, and hydrocarbons. Typically, the liquids include water, tars, and oils. Lower processing temperatures and longer vapour residence times favour the production of char—such processing is often referred to as "slow pyrolysis". Moderate temperatures and short vapour residence times favour the production of liquids—such processing is often referred to as "fast pyrolysis".

Slow pyrolysis is characterised by a relatively slow heating rate (typically less than 10° C./sec) and long gas and solids residence times, producing gas, liquids and char in approximately equal amounts. Known slow pyrolysis processes include processes based on the use of retorts, kilns, and vertical packed bed reactors.

Fast pyrolysis is characterised by rapid decomposition of biomass and the formation of more than 50% liquids, with the process heat requirements being provided from the remaining decomposition products, i.e. gas and char. Typical reported heat rates are of the order of 500° C./sec or more. Known fast pyrolysis processes include processes based on the use of bubbling fluidised beds, circulating fluidised beds, rotating cone reactors and twin screw reactors.

The known methods and apparatus for pyrolysing organic materials require high capital and/or operating costs for commercial scale production or can not be scaled up from current pilot or demonstration plant size to commercial production scale plants or are not efficient in energy terms to be viable in the short term and the longer term. This latter point will become increasingly important as there is increasing pressure for technology to operate in an energy efficient manner.

The above description is not to be taken as an admission of the common general knowledge in Australia and elsewhere.

SUMMARY

The present invention is a low capital cost and energy efficient and scalable alternative to the known pyrolysis technology discussed above.

The present invention is also a low capital cost and energy efficient and scalable alternative to known drying technology.

In broad terms, in accordance with the present invention, solid organic material is moved through a reaction chamber and exposed to a temperature profile within the chamber that dries and pyrolyses the organic material and releases water vapour and a volatile products gas phase. The water vapour phase and the volatile products gas phase are moved counter-current to the solid organic material so that the water vapour phase and condensable components of the volatile products gas phase condense in cooler upstream sections of the chamber and form a liquid water product and a separate liquid oil product. The liquid water product is discharged via an outlet along the length of the chamber and a dried and pyrolysed solid product is discharged from a downstream outlet in the chamber.

According to the present invention there is provided a method for pyrolysing a solid organic feed material, such as biomass and coal and blends of biomass and coal, which comprises:

(a) supplying the solid organic feed material to an inlet of a pyrolysis reaction chamber;

(b) moving the solid organic material through the reaction chamber from the inlet to a downstream end of the chamber and exposing the organic material to a temperature profile within the chamber that dries and pyrolyses the organic material and releases water vapour and a volatile products gas phase from the organic material as the organic material moves through the chamber;

(c) moving the water vapour phase and the volatile products gas phase produced by heating the solid organic material in step (b) through the reaction chamber in a direction counter to that of the solid organic material so that the water vapour phase and condensable components of the volatile products gas phase condense in cooler upstream sections of the chamber and form a liquid water product and a separate liquid oil product; and (d) discharging the liquid water product via an outlet along the length of the chamber and a dried and pyrolysed solid product from a downstream outlet in the chamber.

Step (b) may comprise moving the solid organic material and the condensed liquid oil product formed in step (c) towards the downstream end of the chamber and drying and pyrolysing the solid organic material as described above and volatilizing and cracking the liquid oil product into a gas phase as a consequence of the temperature profile within the chamber.

Step (c) may comprise moving the gas phases produced by heating the solid organic material in step (b) and the gas phase produced by heating the liquid oil product in step (b) through the reaction chamber in the direction counter to that of the solid organic material and the liquid oil product so that the water vapour phase and condensable components of the other gas phases condense in cooler upstream sections of the chamber and form the liquid water product and the liquid oil product.

The method may be operated until all the liquid oil product is volatilized and cracked to a non-condensable gas. The gas may comprise methane and/or ethane.

Step (d) may comprise discharging the liquid water product and the liquid oil product via separate outlets along the length of the chamber.

Step (d) may comprise discharging an off-gas phase from the upstream end of the chamber.

The dried and pyrolysed solid product may be a char product.

The dried and pyrolysed solid product may be dried coal.

The method may be operated on a continuous basis or on a semi-continuous basis.

The temperature profile in the reaction chamber may comprise a plurality of zones successively along the length of the chamber in which different reactions occur as the organic material moves form the upstream end to the downstream end of the chamber.

The temperature profile in the reaction chamber may comprise temperatures less than 100° C. in a first temperature zone (Zone 1: Water Condensation) that condenses the water vapour phase produced in the chamber and forms the above-mentioned liquid water product which is removed from the reaction chamber.

The temperature profile in the reaction chamber may comprise temperatures in a range of 100-150° C. in a second temperature zone (Zone 2: Water Vaporisation) in which water evaporates from the solid organic material and moves upstream as the water vapour phase to the water condensation zone.

Zones 1 and 2 may be described as a water reflux region of the reaction chamber.

The temperature profile in the reaction chamber may comprise temperatures in a range of 150-Tx° C. in a third temperature zone (Zone 3: Oil Condensation) that decomposes the organic material and produces a part of the volatile products gas phase, where Tx is a temperature that is below condensation temperatures of condensable components of the volatile products gas phase. Hence, Zone 3 is the zone in which condensable components of the volatile products gas phase condense and form the above-mentioned liquid oil product, which is optionally removed from the reaction chamber.

The temperature profile in the reaction chamber may comprise temperatures in a range of Tx up to 600° C. in a fourth temperature zone (Zone 4: Oil Vaporisation) that decomposes the organic material and forms the dried and pyrolysed solid product and generates a further part of the volatile products gas phase and the above-mentioned dried and pyrolysed product.

Zones 3 and 4 may be described as an oil reflux region of the reaction chamber.

The temperature profile in the reaction chamber may comprise temperatures in a range decreasing from 600 to 100° C. in a fifth temperature zone (Zone 5: Char Cooling), with the temperature zone recuperating heat energy in the dried and pyrolysed product.

The temperature profile in the reaction chamber may comprise at least Zones 1-4.

The method may comprise injecting liquid water into the downstream end of the chamber and evaporating the water and thereby recuperating heat energy in the dried and pyrolysed product and forming water vapour that moves upstream successively through Zones 4, 3 and 2 counter-current to the movement of solid organic material in the chamber before condensing in Zone 1.

The method may comprise generating the temperature profile by controlling heat transfer in the reaction chamber.

The method may comprise generating the temperature profile in the reaction chamber by supplying an oxygen-containing gas to the reaction chamber and at least partially combusting combustible gases in the reaction chamber. The combustible gases may be generated by pyrolysis of organic material in the reaction chamber.

The method may comprise supplying the oxygen-containing gas to the reaction chamber in a region of the chamber in which there is devolatilization of organic material, such as Zone 4, whereby the devolatilization produces combustible gases that are combusted by the oxygen-containing gas. Supplying the oxygen-containing gas in this region of the reaction chamber optimises the combustion of combustible gases.

The oxygen-containing gas may be oxygen-enriched air.

According to the present invention there is provided a method for drying a solid organic feed material, such as coal, which comprises:

(a) supplying solid organic feed material to an inlet of a reaction chamber;

(b) moving the solid organic material through the reaction chamber from the inlet to a downstream end of the chamber and exposing the organic material to a temperature profile within the chamber that dries the organic material and releases water as water vapour from the organic material as the organic material moves through the chamber;

(c) moving the water vapour produced by heating the solid organic material in step (b) through the reaction chamber in a direction counter to that of the solid organic material so that the water vapour condenses in cooler upstream sections of the chamber and forms a liquid water product; and (d) discharging the liquid water product via an outlet in the chamber and a dried solid product from a downstream outlet in the chamber.

According to the present invention there is also provided an apparatus for pyrolysing an organic feed material, including biomass and coal, including blends of biomass and coal, which comprises:

(a) a pyrolysis reaction chamber having an upstream end, a downstream end, an inlet for organic feed material, an outlet for gas produced in the chamber, and separate outlets for (i) a liquid water product and (ii) a dried and pyrolysed product;

(b) an assembly for moving organic material through the reaction chamber from the upstream end towards the downstream end of the chamber counter-current to the flow of gas generated in the chamber;

(c) an assembly for establishing a temperature profile in the reaction chamber that comprises the following temperature zones extending successively along the length of the reaction chamber from the upstream end of the chamber: a first temperature zone for water condensation (Zone 1), a second temperature zone for water vaporisation (Zone 2), a third temperature zone for oil condensation (Zone 3), and a fourth temperature zone for oil vaporisation and forming the dried and pyrolysed product (Zone 4).

The apparatus may also comprise a separate outlet for a liquid oil product.

The dried and pyrolysed solid product may be a char product.

The dried and pyrolysed solid product may be dried coal.

The temperature profile in the reaction chamber may comprise a fifth temperature zone for cooling the dried and pyrolysed solid product (Zone 5) from Zone 4.

The assembly for establishing the temperature profile in the reaction chamber may comprise a plurality of heat transfer members that extend within the chamber to contribute to establishing and maintaining the temperature profile in the chamber.

The heat transfer members may extend from the downstream end of the reaction chamber.

The heat transfer members may extend through at least Zones 5 and 4.

The heat transfer members may extend through Zones 5, 4, 3, and 2.

The heat transfer members may be elongate members.

The heat transfer members may comprise copper cores and stainless steel sleeves.

The assembly for establishing the temperature profile in the reaction chamber may comprise an outer section of the chamber that is formed from a high heat transfer material. The material may be copper.

The assembly for establishing the temperature profile in the reaction chamber may comprise a means for supplying an oxygen-containing gas into the chamber.

The gas supply means may comprise a passageway for the oxygen-containing gas and at least one outlet in at least one of the heat transfer members for supplying the gas into the reaction chamber.

The outlet may be located in a region of the reaction chamber, such as Zone 4, that in use is a region in which there is decomposition of organic material by devolatilisation of the material.

The assembly for establishing the temperature profile in the reaction chamber may comprise a means of supplying liquid water into the reaction chamber at the downstream end of the chamber.

The water supply means may comprise an inlet and a number of outlets into the chamber.

The assembly for moving organic material through the reaction chamber from the upstream end to the downstream end of the chamber may be in the form of a piston assembly that can move forwardly in the reaction chamber and progressively push organic material towards the downstream end and move rearwardly in the chamber and form a cavity for receiving fresh organic material to be pyrolysed in the chamber.

Alternative solids conveyance methods, such as screw feeder mounted on a central shaft within the chamber 3, may also be used to move organic material towards the downstream end of the chamber.

According to the present invention there is also provided an apparatus for drying organic feed materials, including coal, which comprises:

(a) a reaction chamber having an upstream end, a downstream end, an inlet for organic feed material, an outlet for gas produced in the chamber, and separate outlets for (i) a liquid water product and (ii) a dried product;

(b) an assembly for moving organic material through the reaction chamber from the upstream end towards the downstream end of the chamber counter-current to the flow of gas generated in the chamber;

(c) an assembly for establishing a temperature profile in the reaction chamber that comprises at least the following temperature zones extending successively along the length of the reaction chamber from the upstream end of the chamber: a first temperature zone for water condensation (Zone 1) and a second temperature zone for water vaporisation (Zone 2).

BRIEF DESCRIPTION OF THE DRAWINGS

The present invention is described further with reference to the accompanying drawings, of which.

DETAILED DESCRIPTION

The following description is in the context of drying and pyrolysing an organic feed material in the form of a blend of biomass and brown coal, with the biomass being in the form of algae. It is noted that the method and the apparatus of the present invention is not confined to these particular organic materials.

The embodiment of the apparatus of the present invention shown in FIGS. 1-5 has structural features that make it possible to establish and maintain a required temperature profile in a reaction chamber 3 of the apparatus to operate one embodiment of the method of the present invention in the chamber 3.

In particular, important features of the apparatus include, for example, selection of the length of the chamber 3, selection of the feed rate of organic material through the chamber 3, providing targeted injection of oxygen-containing gas into the chamber 3, providing targeted injection of liquid water into a downstream end of the chamber 3, and providing a means for achieving internal heat transfer within the chamber 3.

Figure 1:
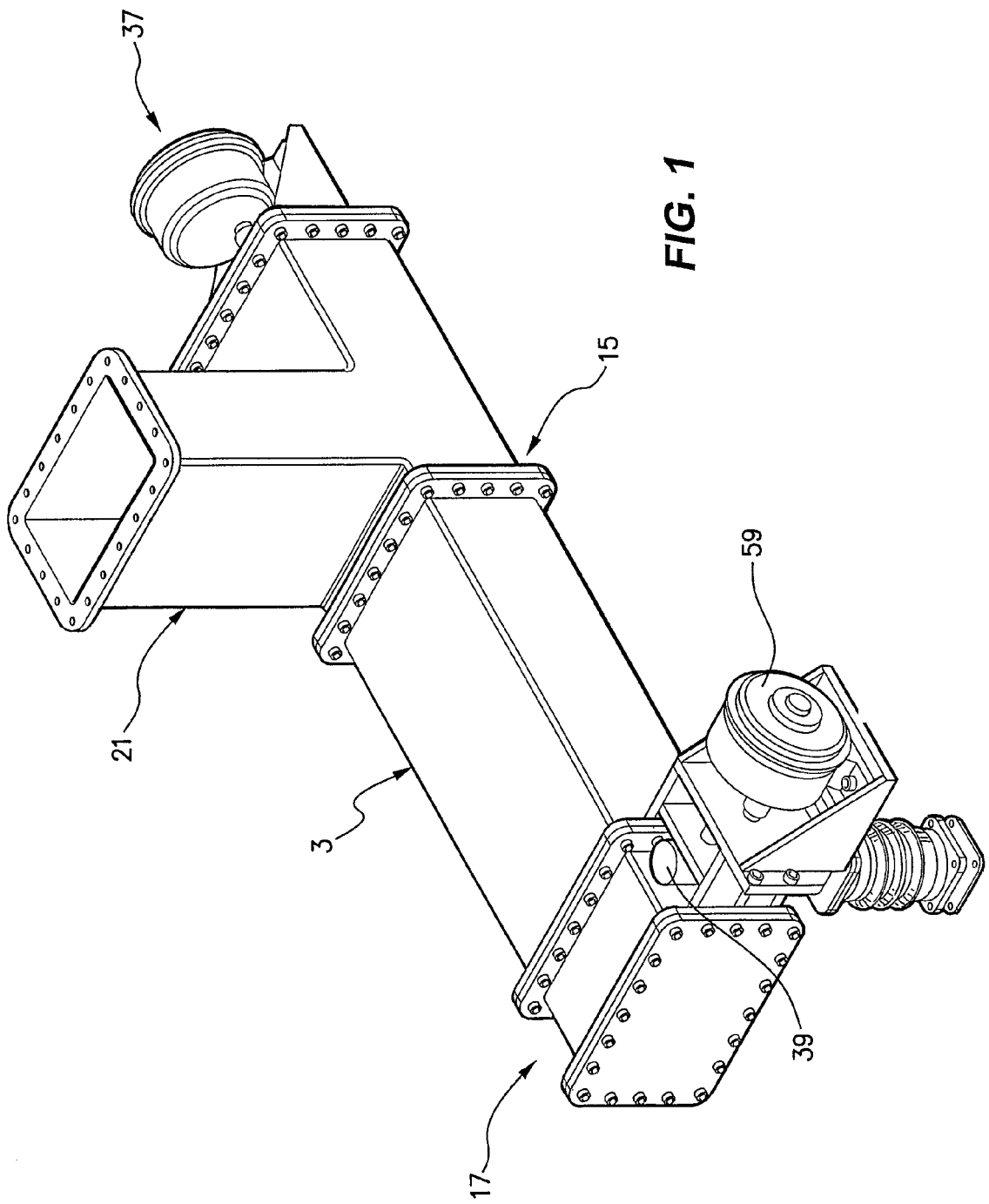
FIG. 1 is a perspective view of one embodiment of an apparatus for pyrolysing an organic feed material in accordance with the present invention.
Figure 3:
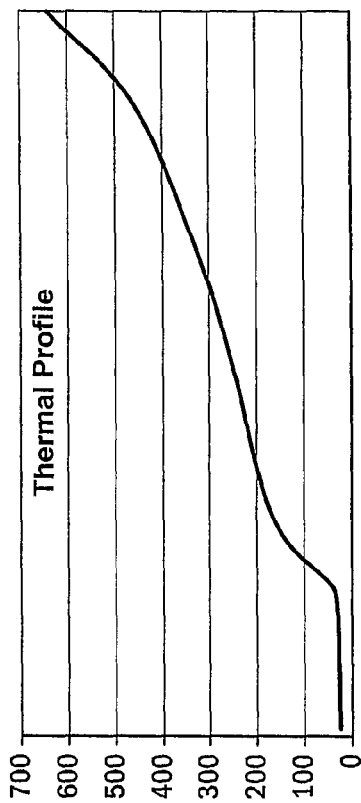
FIG. 3 shows a temperature profile in the interior of the apparatus in accordance with one embodiment of a method of pyrolysing an organic feed material in accordance with the present invention.
Figure 2:
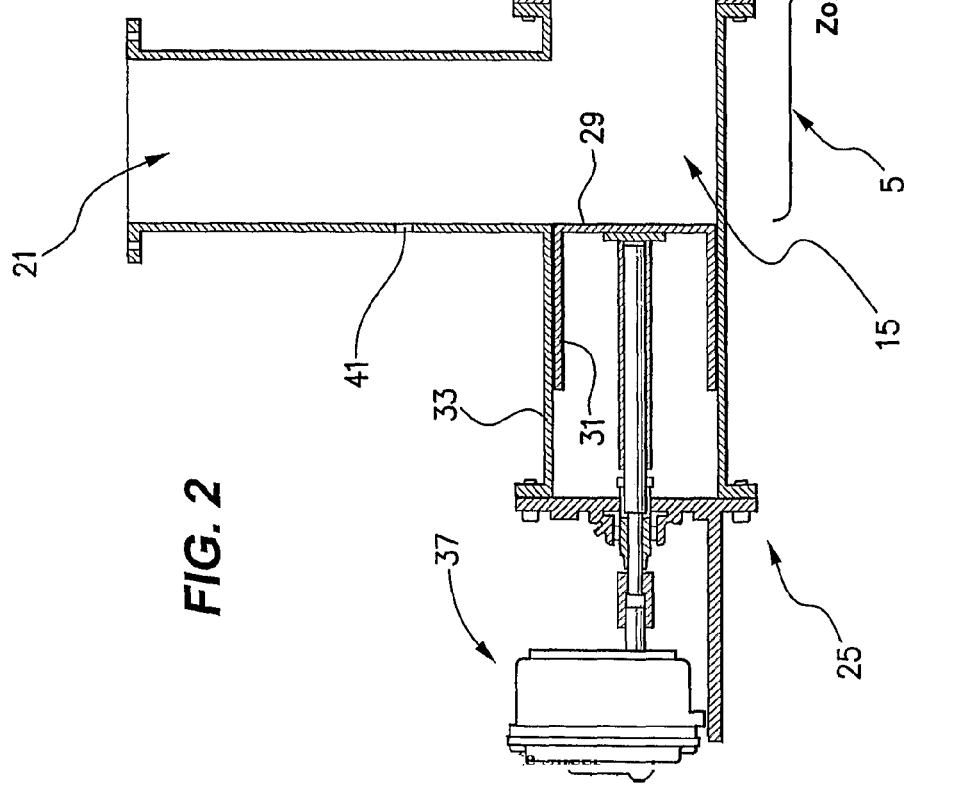
FIG. 2 is a cross-sectional view of the apparatus.
Figure 4:
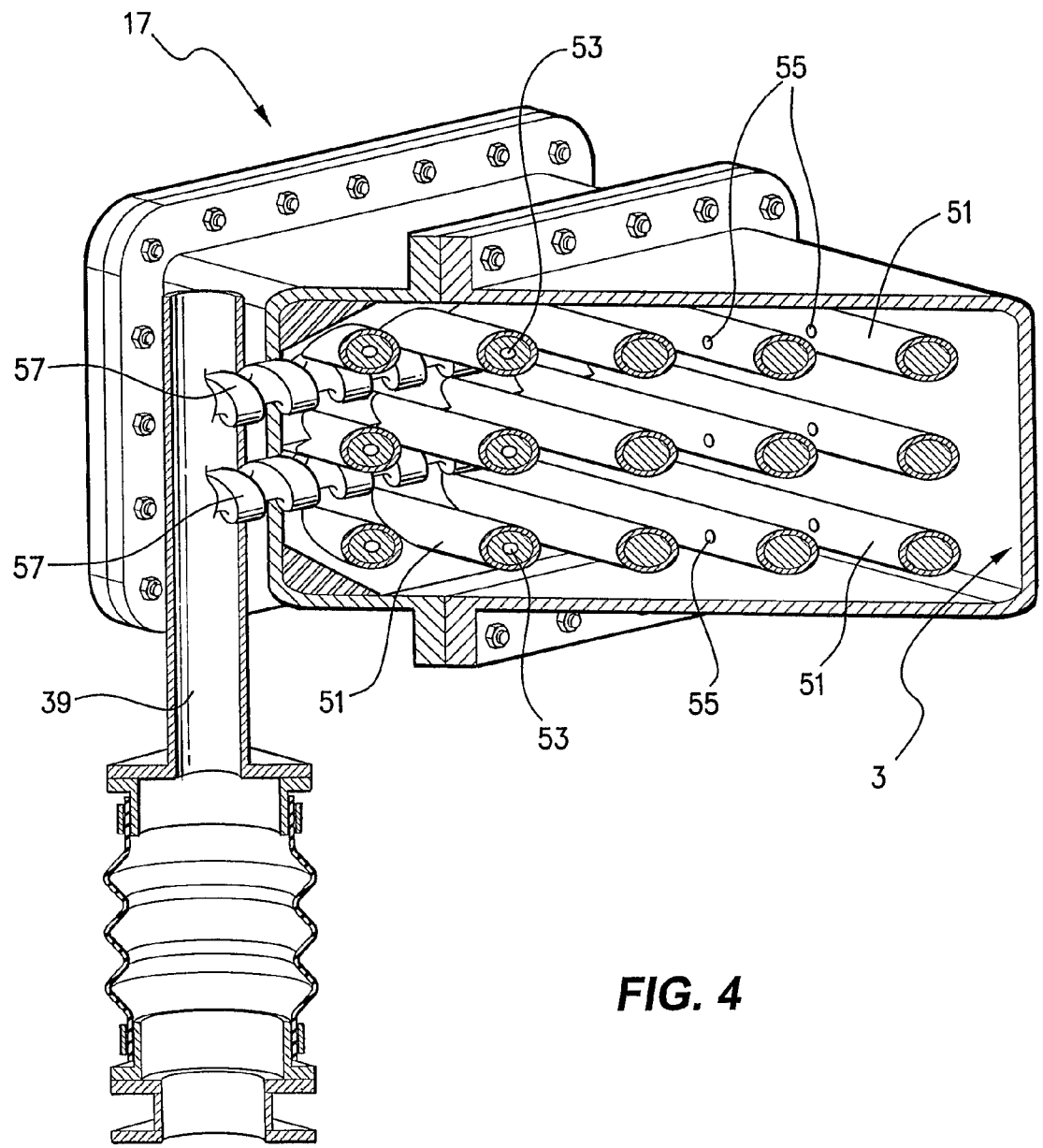
FIG. 4 is an internal view of the outlet end of the apparatus which illustrates the assembly for establishing and maintaining a required temperature profile in the reaction chamber of the apparatus.
Figure 5:
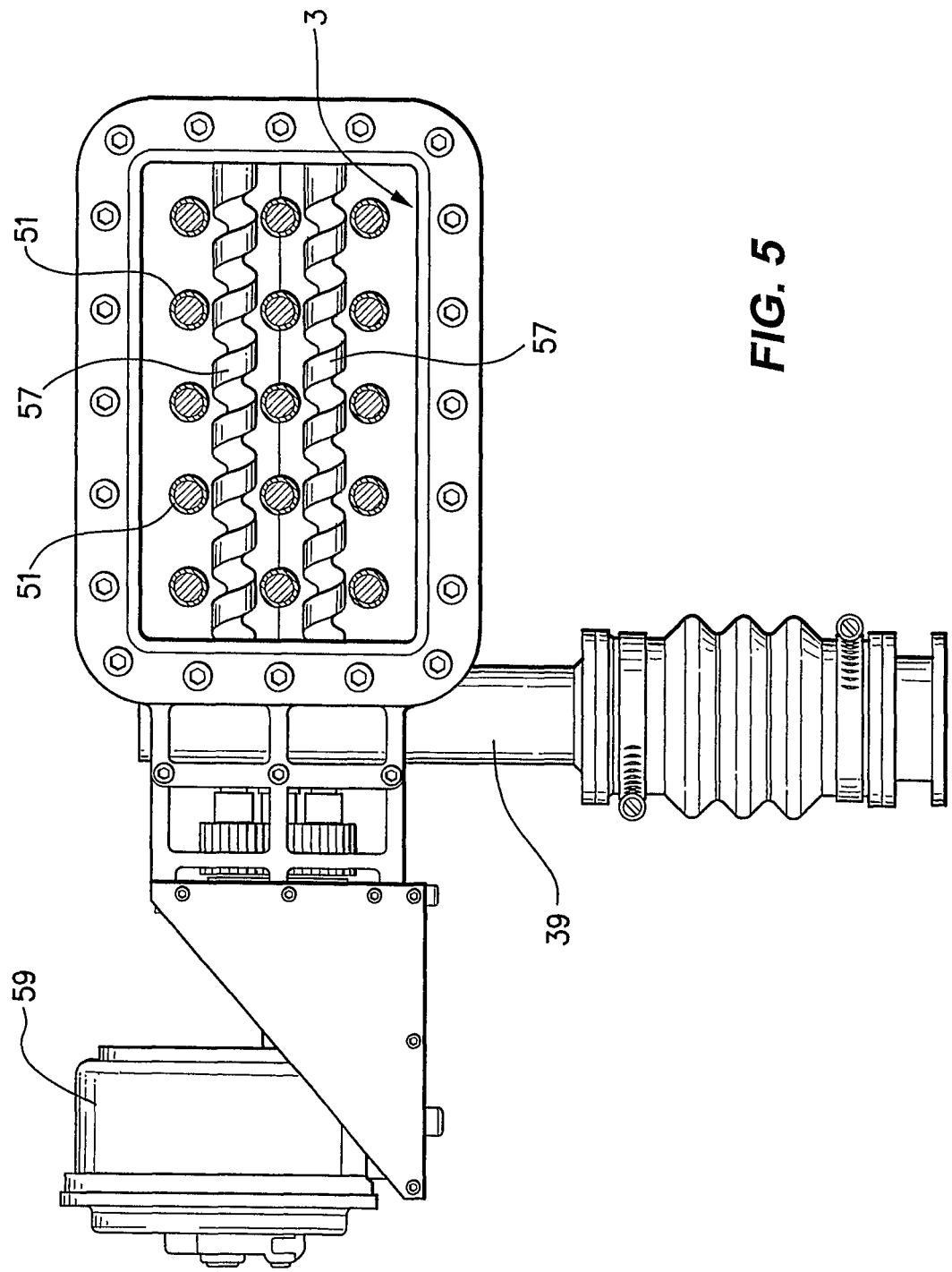
FIG. 5 is a char extraction assembly of the apparatus.

With reference to FIG. 3, the required temperature profile for the embodiment shown in FIGS. 1-5 comprises the following temperature zones successively along the length of the reaction chamber 3 from an upstream end of the chamber 3: a first temperature zone 5 for water condensation (Zone 1), a second temperature zone 7 for water vaporisation (Zone 2), a third temperature zone 9 for oil condensation and decomposition of organic material (Zone 3), and a fourth temperature zone 11 for oil vaporisation and further decomposition of organic material resulting in char formation (Zone 4).

The temperature profile dries organic feed material to evaporate water from the material in the second temperature zone 7 and then decomposes the dried organic feed material progressively and condenses the gases produced by the decomposition as (a) a liquid water product in the first temperature zone 7 and (b) a liquid oil product in the third temperature zone 9 and ultimately forms a char product in the fourth temperature zone 11. It is noted that there are overlap regions between the respective zones shown in the Figure.

Moreover, the temperature profile is typically such that the organic material is not heated to temperatures in excess of 700° C. at which there are potential safety issues arising from the prospect of forming precursors of dioxins and ultimately dioxins.

With reference to the Figures, the apparatus comprises the above-mentioned elongate reaction chamber 3, which is typically rectangular or circular in cross section. It is noted that the chamber 3 could be any suitable shape. It is also noted that the chamber 3 could be formed from any suitable materials. The chamber 3 has an upstream end 15 at one end of the chamber 3, a downstream end 17 at the other end of the chamber 3, an outlet 35 for discharging the liquid water product from the chamber 3 approximately 45% along the length of the chamber 3 from the upstream end 15, an outlet 37 for discharging the liquid oil product from the chamber 3 approximately 65% along the length of the chamber 3 from the upstream end 15, and an outlet 39 for discharging char from the chamber 3 at the downstream end 17 of the chamber 3. The above-mentioned locations of the outlets 35, 37 are approximate only.

The apparatus also comprises a feed hopper 21 for supplying organic feed material to the upstream end 15 of the reaction chamber 3. The feed hopper 21 is a sealed hopper. In addition, the hopper 21 comprises an outlet 41 for non-condensable gases produced in the reaction chamber 3.

The apparatus also comprises an assembly generally identified by the numeral 25 that forces feed material forwardly in the reaction chamber 3 from the upstream end 15 towards the downstream end 17. The assembly 25 comprises (a) a piston assembly that comprises a front plate 29 and a rearwardly extending sleeve 31, (b) a cylinder 33 within which the piston assembly that can slide forwardly and rearwardly in the chamber 3, and (c) a drive assembly 37 that can move the piston assembly in a forward and then a rearward stroke. This is a simple and reliable arrangement whereby forward movement of the piston assembly forces feed material forward towards the downstream end 17 of the chamber 3 and rearward movement of the piston assembly creates a cavity immediately below the feed hopper 21 whereby new feed material can move downwardly into the cavity from the feed hopper 21. In use, the assembly 25 moves "plugs" of new feed material forward within the chamber 3.

The apparatus also comprises an assembly for establishing and maintaining the required temperature profile in the reaction chamber 3. The assembly generates heat in the reaction chamber 3 and transfers heat within the chamber 3 to establish and maintain the temperature profile in the chamber 3. The assembly comprises a plurality of heat transfer members in the form of parallel rods 51 that extend within the chamber. The rods 51 have copper cores and stainless steel outer sleeves. The copper cores provide the required high thermal conductivity and the stainless steel sleeves provide the required structural strength at high temperatures within the chamber 3. The rods 51 extend from the downstream end 17 of the chamber 3 into the fourth temperature zone 11 that further decomposes the organic material and produces a volatile gas product and the char product. The rods 51 also extend into the third temperature zone 9 in which the condensable gases condense and produce the liquid oil product. As is discussed further hereinafter, the temperature profile in the third temperature zone 9 is such that there is decomposition of organic material in this zone, particularly in the higher temperature downstream end of the zone. The assembly also comprises a means for supplying an oxygen-containing gas into the reaction chamber. The gas supply means comprises a passageway 53 for the oxygen-containing gas, typically an air/oxygen mixture, and at least one outlet 55 in a plurality of the rods 51 for supplying the gas into the reaction chamber 3. The outlets 55 are located in a region of the reaction chamber 3 that, in use, is a region in which there is decomposition of organic material by devolatilisation of the material, which produces combustible gases, so that there is combustion of these combustible gases in this region. Typically, this region is in an upstream end of the fourth temperature zone 11 in the reaction chamber 3.

The apparatus also comprises an assembly for extracting the char product from the chamber 3 via the outlet 39. The assembly comprises a pair of horizontally, disposed char extraction screws 57 that extend transversely to the reaction chamber 3 at the downstream end 17 of the chamber and are connected to the outlet 39. The assembly also comprises a drive motor 59 to rotate the screws 57.

The apparatus also comprises a resistance heater 61 located at the downstream end 17 of the reaction chamber 3. The heater 61 is provided for use at start-up of the method, as described below.

In use, the reaction chamber 3 is packed with an initial charge of organic feed material. The heater 61 is then operated to establish the above-described temperature profile within the reaction chamber 3. Thereafter, the drive assembly 37 is operated to move the front plate 29 forwardly and then rearwardly in the chamber 3. The forward movement of the plate 29 moves the organic material forward within the chamber 3. Rearward movement of the plate 29 creates a cavity that allows new organic feed material to be supplied via the feed hopper 21 into the reaction chamber 3. Progressively, the drive assembly 37 moves plugs of organic material forward within the reaction chamber 3. This movement takes the organic material successively through the first temperature zone 5 and downstream temperature zones 7, 9, 11. The first temperature zone 5 dries the organic material, i.e. evaporates non-bound water as water vapour from the material. The second temperature zone 7 decomposes the dried organic material and evaporates bound water as water vapour from the material. The evaporated water vapour flows rearwardly from the second temperature zone 7 into the cooler first temperature zone 5 and condenses within the second temperature zone 5, as a consequence of the temperature conditions within the zone and gas flow within the zone. The resultant liquid water product discharges from the reaction chamber 3 via the outlet 35. The third temperature zone 9 continues the process of decomposing the dried and partially decomposed organic material. As can be seen from FIG. 3, the temperature within this zone ranges from around 200° C. at an upstream end of the zone to around 400° C. at a downstream end of the zone. The organic material progressively decomposes in this zone by devolatilizing to produce gaseous hydrocarbons (including combustible gases). The gaseous hydrocarbons flow rearwardly and condensable components of the gaseous hydrocarbons condense in lower temperature regions of the third temperature zone 9 and form a liquid oil product. The liquid oil product discharges from the reaction chamber 3 via the outlet 37. Depending on the conditions, the liquid oil product may include tars. The tars tend to condense as a liquid product in the lower temperature region of the third temperature zone 9 and are carried forward with the organic material towards the downstream end 17 of the chamber 3 into the higher temperature regions of the third temperature zone 9 and are volatilized and cracked into shorter chain gaseous hydrocarbons. These gaseous hydrocarbons flow rearwardly with other reaction gases and condensable components of the gaseous hydrocarbons condense within the third temperature zone 9 and form the liquid oil product. It can be appreciated that this circulating movement of tars within the third temperature zone 9 effectively facilitates destruction of undesirable tars. The fourth temperature zone 11 is at temperatures in a range of 400-600° C. A char product forms in this zone due to further devolatilisation of organic material. The char product discharges from the reaction chamber 3 via the outlet 39. The volatiles released from the organic material flow upstream into the third temperature zone 9 and condensable components of the volatiles condense in lower temperature regions and form liquid oil products.

The temperature profile that is initially established in the reaction chamber 3 via the heater 61 is maintained after start-up of the method by injection of an air/oxygen mixture into the reaction chamber 3 via the passageways 53 and outlets 55 in the heat transfer rods 51 that extend within the chamber 3. As is mentioned above, the outlets 55 are positioned to supply the oxygen-containing gas into the region of the chamber 3 in which there is devolatization of organic material that generates combustible gases. Hence, the oxygen-containing gas is delivered to the region of the chamber 3 in which there is combustible gases. The heat generated by combustion is transferred effectively and efficiently within the reaction chamber 3 via the elongate rods 51. The rods 51 are formed selectively so that the chamber 3 has a length that provides the required temperature profile and sufficient residence time, having regard to the feed rate of organic material within the chamber 3, to allow pyrolysis under conditions described above that produce separate liquid water and liquid oil products that can be discharged from the chamber 3 via separate the outlets 35, 37.

The gas flow within the chamber 3 is counter-current to the movement of organic material with the chamber 3. This counter-current movement is helpful in terms of heat transfer and formation of separate liquid water and oil products. The reaction gases flow rearwardly within the chamber 3 towards the upstream end 15 and the condensable gases condense as described above. The non-condensable gases then flow into the feed hopper 21 and discharge as an off-gas from the apparatus via the outlet 41. The off-gas may comprise CO, $CO_2$, methane, ethane, and nitrogen. Depending on the feed material and the operating conditions within the chamber 3, the off-gas may have sufficient calorific value to be used as a source of energy in the method.

Extensive mathematical modelling was used by the applicant to develop the method and the apparatus of the present invention. This involved 2-D transient modelling of material and energy balances, thermodynamics and heat transfer under pyrolysis conditions, incorporating Computer Aided Thermal Analysis ("CATA") data for candidate feed materials. The modelling assumed continuous biomass and/or coal feeding and char removal, internal heat generation by oxygen-containing gas injection, and combustion of some of the pyrolysis gas.

Figure 6:
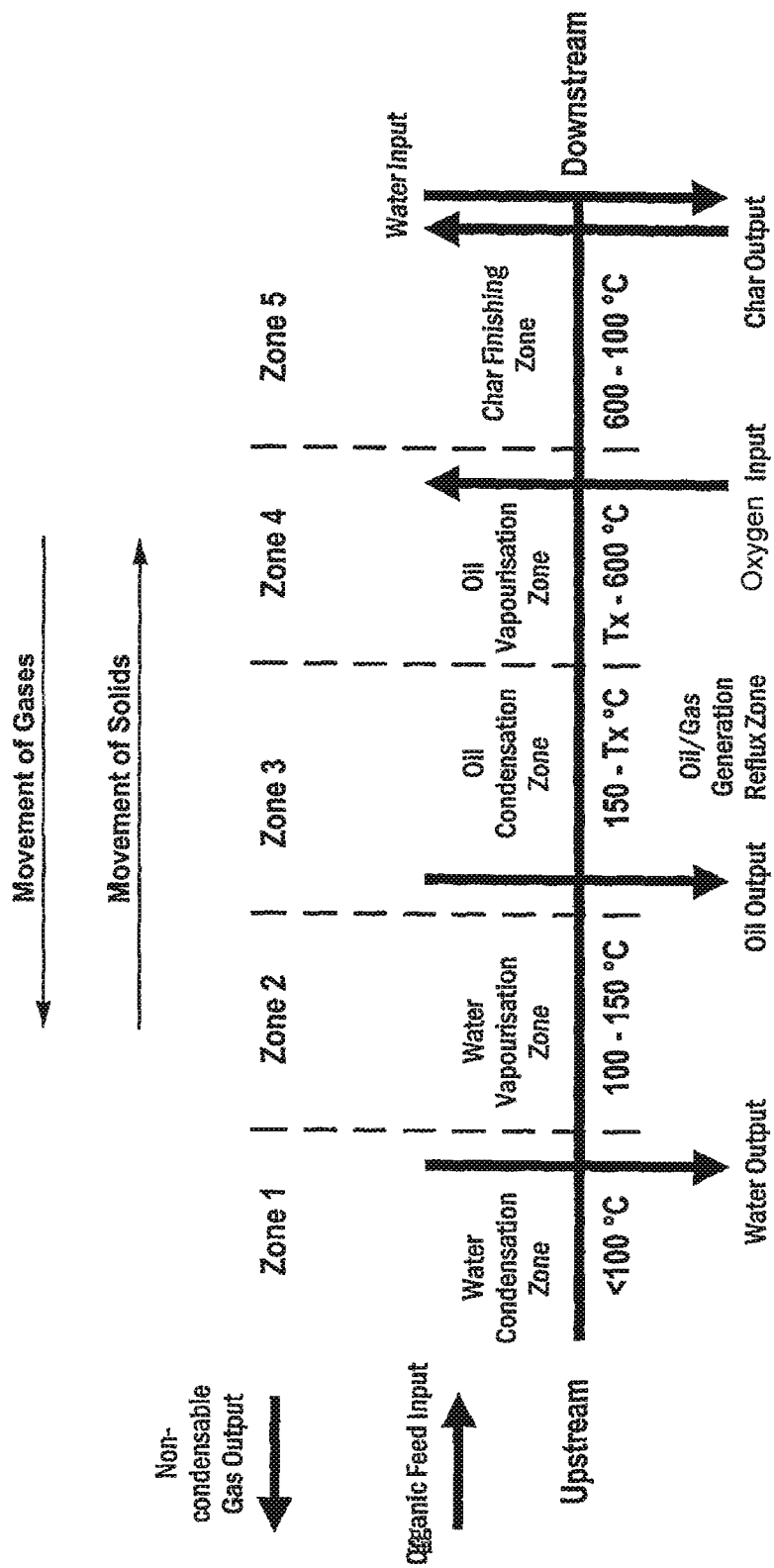
FIG. 6 is a schematic of the temperature zones within the reaction chamber in accordance with another, although not the only other, embodiment of an apparatus for pyrolysing an organic feed material in accordance with the present invention.

As can best be seen in FIG. 6, an alternative temperature profile for the chamber 3 comprises the temperature Zones 1-4 described above and a fifth temperature zone for cooling the dried and pyrolysed solid product (Zone 5) from Zone 4 from 600 to 100° C., with the temperature zone recuperating heat energy in the dried and pyrolysed product. Such energy recuperation is achieved, by way of example, by injecting water into the downstream end of the chamber 3.

Figure 7:
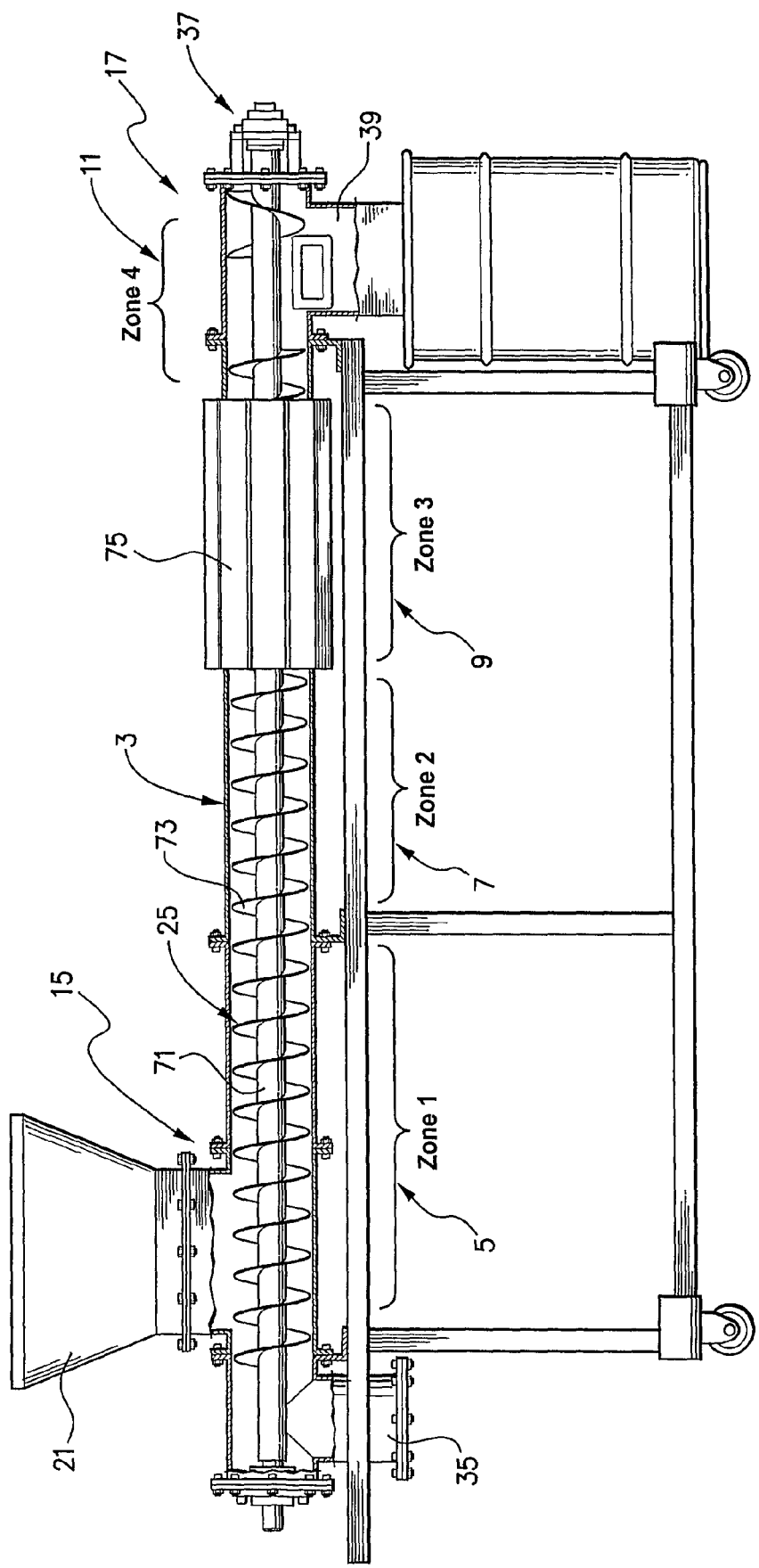
FIG. 7 is a partly cross-sectional side view of another, although not the only other, embodiment of an apparatus for pyrolysing an organic feed material in accordance with the present invention.

The embodiment of the apparatus of the present invention shown in FIG. 7 is similar to the embodiment of the apparatus shown in FIGS. 1-5 and the same reference numerals are used to describe the same structural features.

The main differences between the two embodiments relate to the feed assembly for moving solid organic feed material through the reaction chamber 3, the way in which heat is transferred within the downstream end section of the chamber 3 to form the required temperature profile within the chamber 3, and the absence of an outlet for discharging a liquid oil product in the FIG. 7 embodiment.

With reference to FIG. 7, the chamber 3 has an upstream end 15, a downstream end 17 at the other end, an outlet 35 for discharging the liquid water product from the chamber 3 at the upstream end 15, and an outlet 39 for discharging char at the downstream end 17 of the chamber 3.

The embodiment of the apparatus shown in FIG. 7 also comprises a feed hopper 21 for supplying organic feed material to the upstream end 15 of the reaction chamber 3. The feed hopper 21 is a sealed hopper. In addition, the hopper 21 comprises an outlet (not shown) for non-condensable gases produced in the reaction chamber 3.

The apparatus also comprises an assembly generally identified by the numeral 25 that forces feed material continuously forwardly in the reaction chamber 3 from the upstream end 15 towards the downstream end 17. The assembly 25 comprises a rotatable shaft 71 and a screw feeder 73 on the shaft 71. This is a simple and reliable arrangement whereby rotation of the shaft 71 about its axis forces feed material from the hopper 21 forward towards the downstream end 17 of the chamber 3.

The apparatus also comprises an assembly for establishing and maintaining the required temperature profile in the reaction chamber 3. The assembly generates heat in the reaction chamber 3 and transfers heat within the chamber 3 to establish and maintain the temperature profile in the chamber 3. The assembly comprises an outer solid copper sleeve 75 (or other suitable high heat transfer material) that is positioned around the section of the chamber 3 that forms the third temperature zone 9 (Zone 3) of the required temperature profile. The assembly also comprises the part of the shaft 71 that is housed within the copper sleeve 75 being formed from a high heat transfer material, such as copper. As is mentioned above, the temperature profile in the third temperature zone 9 and the downstream higher temperature zone 11 (Zone 4) is such that there is decomposition of organic material in these zones, particularly in the higher temperature downstream end of the zone 11. In order to take advantage of the production of combustible gas in these zones, the assembly also comprises a means for supplying an oxygen-containing gas into the reaction chamber 3. The gas supply means comprises a series of passageways (not shown) in the shaft 71 and/or the sleeve 75 for injecting an oxygen-containing gas, typically an air/oxygen mixture, to combust combustible gases produced by decomposition of organic material in an upstream end of the third temperature zone 9 (Zone 3) and/or in the fourth temperature zone 11 (Zone 4) in the reaction chamber 3. It can be appreciated that the copper section of the shaft 71 and the outer sleeve 75 are effective means of transferring heat along the length of the chamber 3 so that the third temperature zone 9 is sufficiently long to provide the required temperature profile and residence time in the zone.

The apparatus shown in FIG. 7 can be used in accordance with the methods described above in relation to the embodiment of the apparatus shown in FIGS. 1-5, save that the apparatus is particularly suited for a method that operates so that there is total destruction of the liquid oil product produced in the chamber 3. Specifically, the method is operated so that there is volatilization and cracking of liquid oil product that forms in the chamber 3 to the extent that there is total destruction of the liquid oil product into a non-condensable gas that is discharged form the chamber 3, for example via the hopper 21.

The key elements of the above-described embodiments of the method and the apparatus of the present invention are summarised below.

Biomass or coal containing up to 50% moisture (or more) can be processed directly without prior drying—(energy efficiency, lower capital, feed flexibility).

All condensable phases leave the apparatus in their condensed form i.e. char, oil (when produced) and water (not vapour)—i.e. as optimum product values, simple off-gas handling, and low capital cost.

All output streams (oil (when produced), water, char and gas) leave the apparatus at separate points—therefore enabling efficient product recoveries.

The oil generated in the method may undergo refluxing within the reactor, with in situ cracking of the tars—hence enhanced product value—and may lead to total destruction of the oil to produce non-condensable gas.

The gas generated during pyrolysis is more than sufficient to meet process heat requirements—all oil (if any) and char produced in the method is therefore available for economic use—hence, the method is energy efficient and makes it possible to achieve maximum product revenues.

The option exists for "mild pyrolysis" (drying or torrification only) where the maximum temperature in the reaction chamber does not exceed Tx, that is no significant oil vaporisation takes place.

Dioxins can be avoided in the method because operating temperatures can be set to be below dioxin precursor formation—this is important from the health and safety viewpoint.

Nutrients in the feed materials will mainly report to the char—therefore adding value to soil chars.

There is a high degree of feedstock flexibility for currently undervalued biomass and coal resources—as well as high moisture content feeds (eg. most biomass resources).

A range of coarse and fine-sized input materials can be used in the method and the apparatus—typically less than 35 mm.

High mineral matter feed can be used in the method and the apparatus—mineral matter reports to char as ash, and this is not a problem when the char is used in soils.

Peat and brown coal (high moisture) and coal wastes (high mineral matter) can be used in the method and the apparatus.

The heat required to drive the method is generated internally (by combustion of some of the pyrolysis gas) such that the design is scalable to high throughputs (known technologies which apply process heat externally are constrained to about 4 tonne/hour dry biomass throughput)—(high productivity).

The production rate can be controlled/increased by changing the rate of oxygen-containing gas injection—this provides some flexibility to move from slow to flash pyrolysis conditions in the reaction chamber, with corresponding ability to alter oil (if present) and char properties and the oil:char ratio—hence flexibility in terms of a product range, which is potentially important in changing markets.

The method and the apparatus of the present invention create a completely unique thermo-chemical environment compared to known pyrolysis technologies that are commercially available or under development.

Many modifications may be made to the embodiments of the method and the apparatus of the present invention shown in the drawings without departing from the spirit and scope of the invention.

By way of example, whilst the embodiments of the method are concerned with drying and pyrolysing organic material, the present invention is not so limited and extends to embodiments in which organic material is dried only. In such embodiments, external heating may be provided to establish a required temperature profile.

Furthermore, whilst the embodiment of the apparatus shown in FIGS. 1-5 comprises a piston/cylinder feed assembly 25 for moving solid feed material along the length of the chamber 3 and the embodiment of the apparatus shown in FIG. 7 comprises a rotatable shaft and a screw feeder on the shaft positioned in the chamber 3 for moving solid feed material along the length of the chamber 3, the present invention is not so limited and extends to alternative arrangements for achieving heat transfer along the length of the chamber 3 to form a required temperature profile within the chamber.

Furthermore, whilst the embodiments of the apparatus shown in the Figures comprise resistance heaters 61 located at the downstream ends 17 of the reaction chambers 3 for use at start-up of the methods, the present invention is not so limited and extends to alternative arrangements. One such alternative arrangement comprises a natural gas burner.

The invention claimed is:

1. An apparatus for pyrolysing an organic feed material which comprises:
   (a) a pyrolysis reaction chamber having an upstream end, a downstream end, an inlet for organic feed material, an outlet for gas produced in the chamber, and separate outlets for (i) a liquid water product and (ii) a dried and pyrolysed product;
   (b) an assembly for moving organic material through the reaction chamber from the upstream end towards the downstream end of the chamber counter-current to the flow of gas generated in the chamber; and
   (c) an assembly for establishing a temperature profile in the reaction chamber that comprises the following temperature zones extending successively along the length of the reaction chamber from the upstream end of the chamber: a first temperature zone for water condensation (Zone 1), a second temperature zone for water vaporisation (Zone 2), a third temperature zone for oil condensation (Zone 3), and a fourth temperature zone for oil vaporisation and forming the dried and pyrolysed product (Zone 4), wherein the assembly for establishing the temperature profile in the reaction chamber comprises a plurality of heat transfer members that extend within the chamber to contribute to establishing and maintaining the temperature profile in the chamber.

2. The apparatus defined in claim 1, comprises a separate outlet for a liquid oil product.

3. The apparatus defined in claim 1, wherein the heat transfer members are elongate members that comprise copper cores and stainless steel sleeves.

4. The apparatus defined in claim 1, wherein the assembly for establishing the temperature profile in the reaction chamber comprises a means for supplying an oxygen-containing gas into the chamber.

5. The apparatus defined in claim 4, wherein the gas supply means comprises a passageway for the oxygen-containing gas and at least one outlet in at least one of the heat transfer members for supplying the gas into the reaction chamber.

6. The apparatus defined in claim 1, wherein the assembly for establishing the temperature profile in the reaction chamber comprises a means of supplying liquid water into the reaction chamber at the downstream end of the chamber.

* * * * *